United States Patent
Kang

(10) Patent No.: US 11,307,919 B2
(45) Date of Patent: Apr. 19, 2022

(54) FAIL INFORMATION CONTROL CIRCUIT, SEMICONDUCTOR APPARATUS INCLUDING THE SAME, AND FAIL INFORMATION CONTROL METHOD OF SEMICONDUCTOR APPARATUS

(71) Applicant: SK hynix Inc., Icheon-si (KR)

(72) Inventor: Jae Yong Kang, Seoul (KR)

(73) Assignee: SK hynix Inc., Icheon-si (KR)

(*) Notice: Subject to any disclaimer, the term of this patent is extended or adjusted under 35 U.S.C. 154(b) by 113 days.

(21) Appl. No.: 16/709,273

(22) Filed: Dec. 10, 2019

(65) Prior Publication Data
US 2021/0004285 A1    Jan. 7, 2021

(30) Foreign Application Priority Data

Jul. 3, 2019    (KR) .................. 10-2019-0080055

(51) Int. Cl.
| | | |
|---|---|---|
| *G06F 11/00* | (2006.01) | |
| *G06F 11/07* | (2006.01) | |
| *G06F 11/10* | (2006.01) | |

(52) U.S. Cl.
CPC ...... *G06F 11/0772* (2013.01); *G06F 11/0727* (2013.01); *G06F 11/0751* (2013.01); *G06F 11/1068* (2013.01)

(58) Field of Classification Search
None
See application file for complete search history.

(56) References Cited

U.S. PATENT DOCUMENTS

| | | | | |
|---|---|---|---|---|
| 9,778,985 B1* | 10/2017 | Kim | ............. | G11C 29/52 |
| 2012/0254686 A1* | 10/2012 | Esumi | ............. | H03M 13/2906 |
| | | | | 714/763 |
| 2017/0091026 A1* | 3/2017 | Gulati | ............. | G06F 11/1068 |
| 2017/0206124 A1* | 7/2017 | Lim | ............. | G11C 11/5628 |
| 2018/0144813 A1* | 5/2018 | Hong | ............. | G11C 29/56 |
| 2019/0130991 A1* | 5/2019 | Son | ............. | G06F 11/1064 |
| 2020/0183784 A1* | 6/2020 | Shin | ............. | G06F 3/0679 |

FOREIGN PATENT DOCUMENTS

KR    100933861 B1    12/2009

OTHER PUBLICATIONS

Google Scholar/Patents—text refined (Year: 2021).*

* cited by examiner

*Primary Examiner* — Christopher S McCarthy
(74) *Attorney, Agent, or Firm* — William Park & Associates Ltd.

(57) ABSTRACT

A fail information control circuit may include: a comparison circuit configured to generate a comparison result signal by comparing read data and write data; a fail bit discrimination circuit configured to generate a first fail discrimination signal for discriminating a fail detected when the write data has a first value and a second fail discrimination signal for discriminating a fail detected when the write data has a second value, in response to the comparison result signal; and a fail bit counter configured to generate a first counting signal by counting the first fail discrimination signal and generate a second counting signal by counting the second fail discrimination signal.

17 Claims, 12 Drawing Sheets

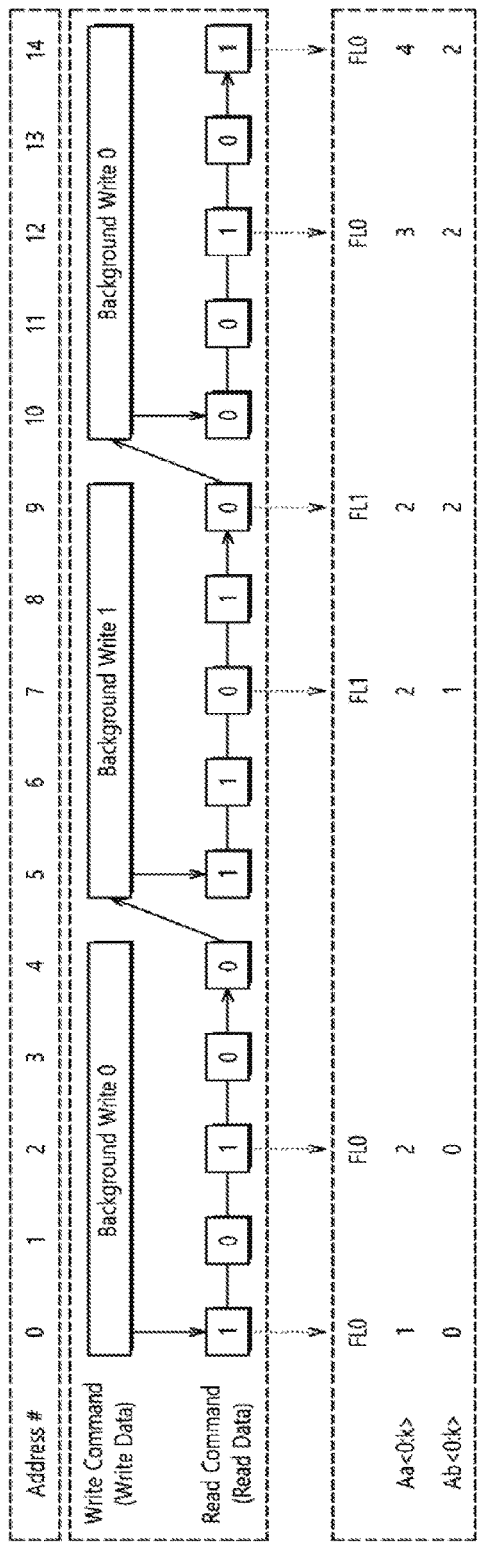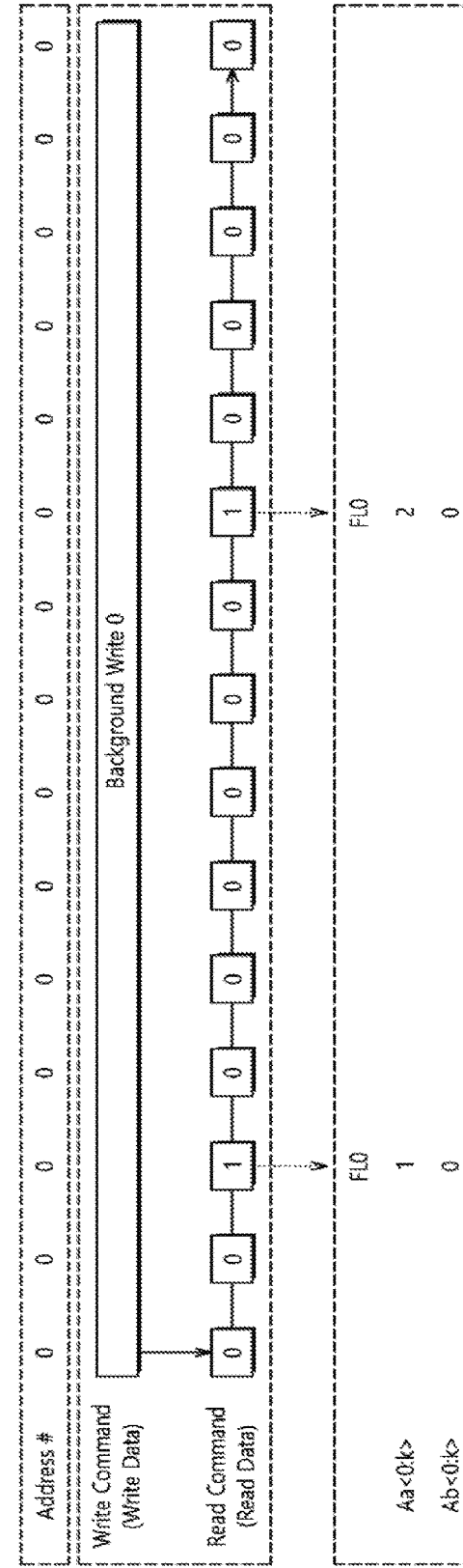
FIG.5
FIG.6

FAIL INFORMATION CONTROL CIRCUIT, SEMICONDUCTOR APPARATUS INCLUDING THE SAME, AND FAIL INFORMATION CONTROL METHOD OF SEMICONDUCTOR APPARATUS

CROSS-REFERENCES TO RELATED APPLICATION

The present application claims priority under 35 U.S.C. § 119(a) to Korean application number 10-2019-0080055, filed on Jul. 3, 2019, in the Korean Intellectual Property Office, which is incorporated herein by reference in its entirety.

BACKGROUND

1. Technical Field

Various embodiments generally relate to a semiconductor circuit, and particularly, to a fail information control circuit, a semiconductor apparatus including the same, and a fail information control method of the semiconductor apparatus.

2. Related Art

For a semiconductor device including memory, failed bits associated with the memory may be counted. Based on the counted number of failed bits, an error correction code (ECC) correction operation may be performed or a repair operation of replacing a failed cell, associated with the failed bits, with a redundancy memory cell may be performed. This, however, does not always make efficient use of the memory space.

SUMMARY

A fail information control circuit capable of efficiently using a memory area, a semiconductor apparatus including the same, and a fail information control method of the semiconductor apparatus are described herein.

In an embodiment, a fail information control circuit may include: a comparison circuit configured to generate a comparison result signal by comparing read data and write data; a fail bit discrimination circuit configured to generate a first fail discrimination signal for discriminating a fail detected when the write data has a first value and a second fail discrimination signal for discriminating a fail detected when the write data has a second value, in response to the comparison result signal; and a fail bit counter configured to generate a first counting signal by counting the first fail discrimination signal and generate a second counting signal by counting the second fail discrimination signal.

In an embodiment, a fail information control circuit may include: a comparison circuit configured to generate a comparison result signal by comparing read data and write data; a fail bit discrimination circuit configured to generate a first fail discrimination signal for discriminating a fail detected when the write data has a first value and a second fail discrimination signal for discriminating a fail detected when the write data has a second value, in response to the comparison result signal; and a fail information output circuit configured to generate a first counting signal and a second counting signal by counting the first fail discrimination signal and the second fail discrimination signal, and to generate a first counting correction signal and a second counting correction signal by resetting remaining bits, except for a most significant bit of a first level among bits of the first counting signal and the second counting signal.

In an embodiment, a semiconductor apparatus may include: a memory area; input/output pads; and a fail information control circuit configured to classify fails, which are detected according to a result of comparing write data provided to the memory area with read data outputted from the memory area, into a case where write data has a first value and a case where the write data has a second value, and count the classified fails to generate a first counting signal and a second counting signal, wherein the first counting signal and the second counting signal are outputted to an exterior through the input/output pads.

In an embodiment, a fail information control method of a semiconductor apparatus may include: a comparison step of comparing read data and write data; a counting step of classifying a type of fail bits into a first fail and a second fail when the write data and the read data do not coincide with each other in the comparison step, and generating a first counting signal and a second counting signal; and an output step of outputting the first counting signal and the second counting signal to an exterior of the semiconductor apparatus.

BRIEF DESCRIPTION OF THE DRAWINGS

FIG. 4 to FIG. 7 are diagrams illustrating examples of test operations.

DETAILED DESCRIPTION

Hereinafter, a fail information control circuit, a semiconductor apparatus including the same, and a fail information control method of the semiconductor apparatus are described in detail with reference to the accompanying drawings.

Figure 1:
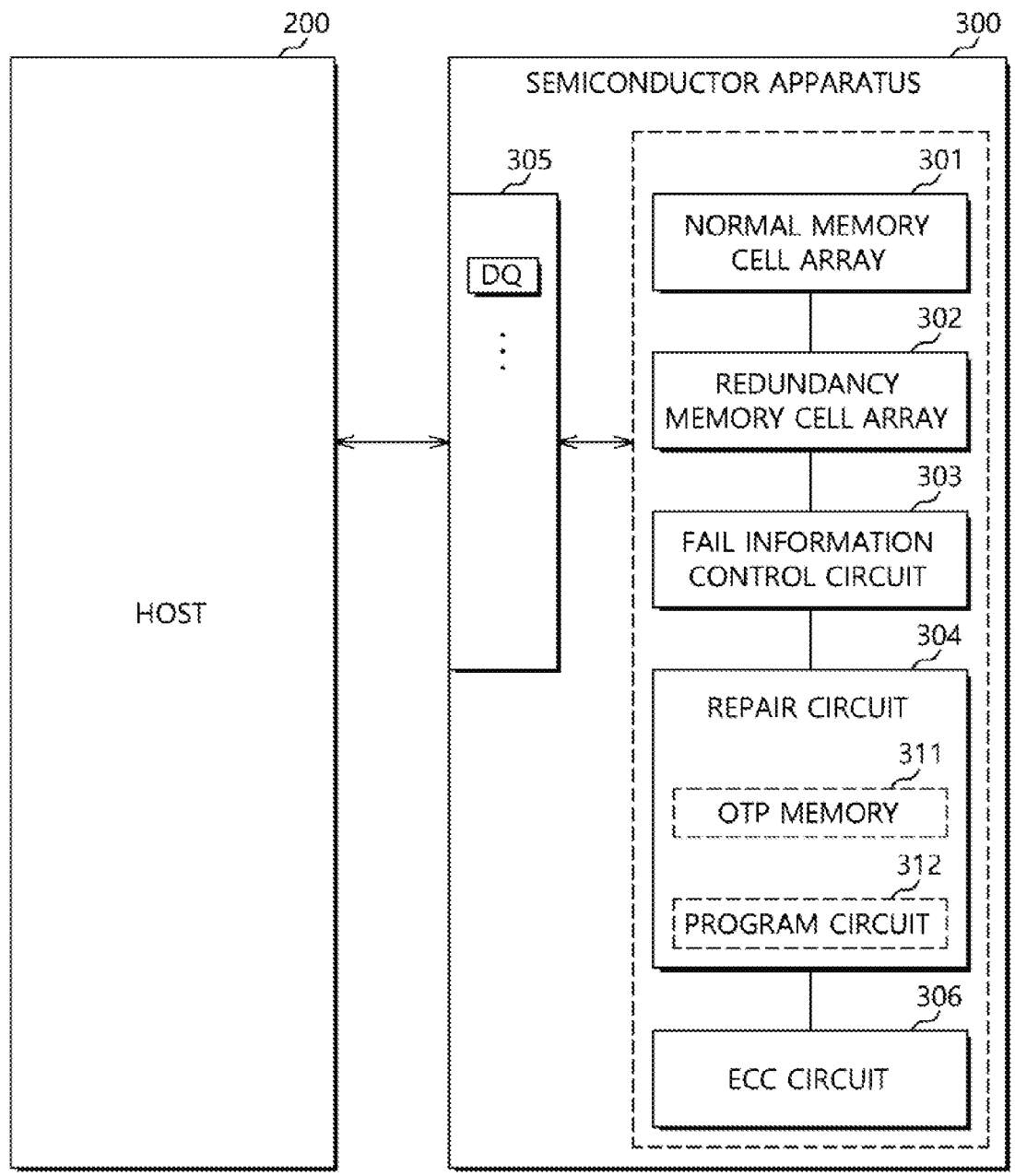
FIG. 1 is a diagram illustrating a configuration of a semiconductor system in accordance with an embodiment.

FIG. 1 is a diagram illustrating a configuration of a semiconductor system 100 in accordance with an embodiment.

Referring to FIG. 1, the semiconductor system 100 may include a host 200 and a semiconductor apparatus 300.

The semiconductor apparatus 300 may include a memory area, a fail information control circuit 303, a repair circuit 304, an ECC circuit 306, and input/output pads 305.

The memory area may include a normal memory cell array 301 and a redundancy memory cell array 302.

The redundancy memory cell array 302 may include redundancy memory cells for repairing unusable memory cells (hereinafter, referred to as failed cells) among memory cells of the normal memory cell array 301.

The fail information control circuit 303 may classify detected fails into a case where write data has a first value (for example, '0') and a case where the write data has a second value (for example, '1'), according to a result of comparing the write data with read data for each address, and count the classified fails to generate counting signals.

The semiconductor apparatus 300 may perform the aforementioned counting signal generation operation on at least one of the normal memory cell array 301 and the redundancy memory cell array 302.

Hereinafter, a fail detected when the write data is '0' is referred to as a first fail, and a signal according to the first fail is referred to as a first fail discrimination signal, and a fail detected when the write data is '1' is referred to as a second fail and a signal according to the second fail is referred to as a second fail discrimination signal.

The fail information control circuit 303 may generate a counting correction signal by correcting a value of the counting signal.

Write data provided to the fail information control circuit 303 may be data (for example, 0 or 1) having a predetermined pattern for a test.

Read data provided to the fail information control circuit 303 may be data read from the normal memory cell array 301 for each address.

The fail information control circuit 303 may output a value of '1' of the counting signal as a counting signal corrected by resetting the remaining bits except for the most significant bit of bits, which is described below with reference to FIG. 6.

The repair circuit 304 may include a one-time programmable (OTP) memory 311 and a program circuit 312.

The OTP memory 311 may include an electrical fuse (e-fuse) array such that a repair operation is possible after the packaging of the semiconductor apparatus 300 as well as before the packaging thereof.

The OTP memory 311 may store an address for accessing an unusable normal memory cell, that is, a failed cell, of the normal memory cell array in the e-fuse array.

The program circuit 312 may program a failed address into the OTP memory 311.

The program circuit 312 may program the failed address by selectively rupturing fuses of the OTP memory 311.

The fuse rupture operation is an operation in which a high voltage is applied to an e-fuse array to destroy a gate insulating layer of a transistor constituting the e-fuse array, and failed address programming is feasible by performing a selective rupture operation on a plurality of e-fuses according to a value of the failed address.

The repair circuit 304 may control an operation of programming the failed address into the OTP memory 311 and an operation of accessing an address corresponding to a redundancy memory cell instead of the failed address when an address provided from an exterior is the failed address during a normal operation.

The ECC circuit 306 may perform a correction operation using an error correction code on input/output data of the semiconductor apparatus 300.

The input/output pads 305 may include data input/output pads DQ.

The host 200 may be, for example, a test device, provide the semiconductor apparatus 300 with a command, an address, and/or write data, and determine the pass or fail of a normal memory cell and/or a redundancy memory cell corresponding to an address according to read data outputted from the semiconductor apparatus 300.

A fail flag may define the number of fail bits according to a timing at which the fail flag is generated, which is described below.

The counting signal, the corrected counting signal, and the fail flag may be used as information on the number of fail bits of read data.

Figure 2:
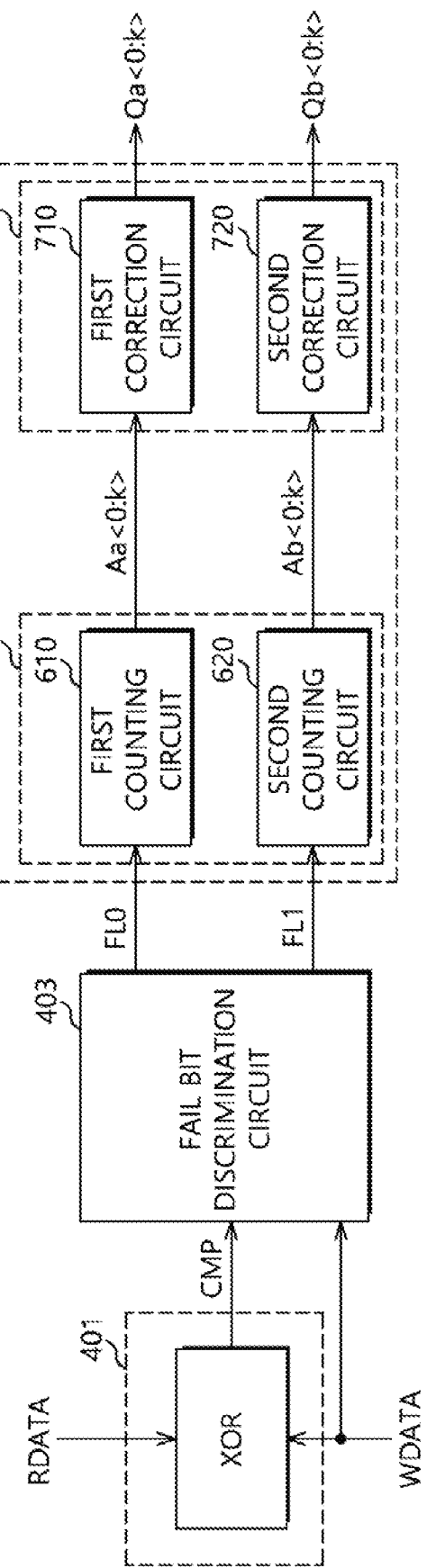
FIG. 2 is a diagram illustrating a configuration of a fail information control circuit in accordance with an embodiment.

FIG. 2 is a diagram illustrating a configuration of the fail information control circuit in accordance with an embodiment.

Referring to FIG. 2, the fail information control circuit 303 may include a comparison circuit 401, a fail bit discrimination circuit 403, and a fail information output circuit 405.

The comparison circuit 401 may generate a comparison result signal CMP by comparing read data RDATA and write data WDATA.

The write data WDATA may be inputted as a random or predetermined pattern (for example, all '0' or all '1'), that is, a pattern promised in advance between the host 200 and the semiconductor apparatus 300.

The comparison circuit 401 may include an exclusive OR logic (XOR).

The exclusive OR logic (XOR) compares the read data RDATA and the write data WDATA by one bit unit. When the read data RDATA and the write data WDATA coincide with each other, the exclusive OR logic (XOR) may output the comparison result signal CMP at a low level, and when the read data RDATA and the write data WDATA do not coincide with each other, the exclusive OR logic (XOR) may output the comparison result signal CMP at a high level.

When the comparison result signal CMP is at a high level, it may indicate that a fail bit has occurred due to an error of a corresponding memory cell.

The fail bit discrimination circuit 403 may generate a first fail discrimination signal FL0 and a second fail discrimination signal FL1 according to the write data WDATA in response to the comparison result signal CMP.

The first fail discrimination signal FL0 may indicate that a detected fail has occurred when the write data is '0'.

The second fail discrimination signal FL1 may indicate that the detected fail has occurred when the write data is '1'.

The fail information output circuit 405 may be configured to generate a first counting signal Aa<0:K> and a second counting signal Ab<0:K> by counting the first fail discrimination signal FL0 and the second fail discrimination signal FL1, and generate a first counting correction signal Qa<0:K> and a second counting correction signal Qb<0:K> by resetting the remaining bits except for the most significant bit of a first level among the bits of the first counting signal Aa<0:K> and the second counting signal Ab<0:K>.

The fail information output circuit 405 may include a fail bit counter 600 and a counting signal correction circuit 700.

The fail bit counter 600 may generate the first counting signal Aa<0:K> by counting the first fail discrimination signal FL0 and generate the second counting signal Ab<0:K> by counting the second fail discrimination signal FL1.

The counting signal correction circuit 700 may output, as the first counting correction signal Qa<0:K>, a signal obtained by resetting the levels of the remaining bits, except for the most significant bit among the high level bits of the first counting signal Aa<0:K>, to a low level.

The counting signal correction circuit 700 may output, as the second counting correction signal Qb<0:K>, a signal obtained by resetting the levels of the remaining bits, except for the most significant bit among the high level bits of the second counting signal Ab<0:K>, to a low level.

Figure 3:
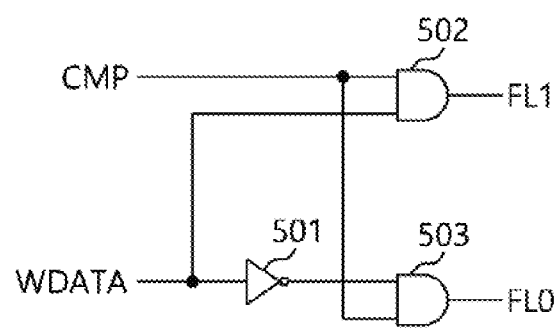
FIG. 3 is a diagram illustrating a configuration of a fail bit discrimination circuit of FIG. 2.

FIG. 3 is a diagram illustrating a configuration of the fail bit discrimination circuit 403 of FIG. 2.

Referring to FIG. 3, the fail bit discrimination circuit 403 may include a first logic gate 501, a second logic gate 502, and a third logic gate 503.

The first logic gate 501 may invert and output the write data WDATA.

The second logic gate 502 may output the second fail discrimination signal FL1 by performing a logical AND operation on the comparison result signal CMP and the write data WDATA.

The third logic gate 503 may output the first fail discrimination signal FL0 by performing a logical AND operation on the comparison result signal CMP and the output signal of the first logic gate 501.

The first counting signal Aa<0:K> and the second counting signal Ab<0:K> may be generated through test operations illustrated in FIG. 4 to FIG. 7.

Figure 4:
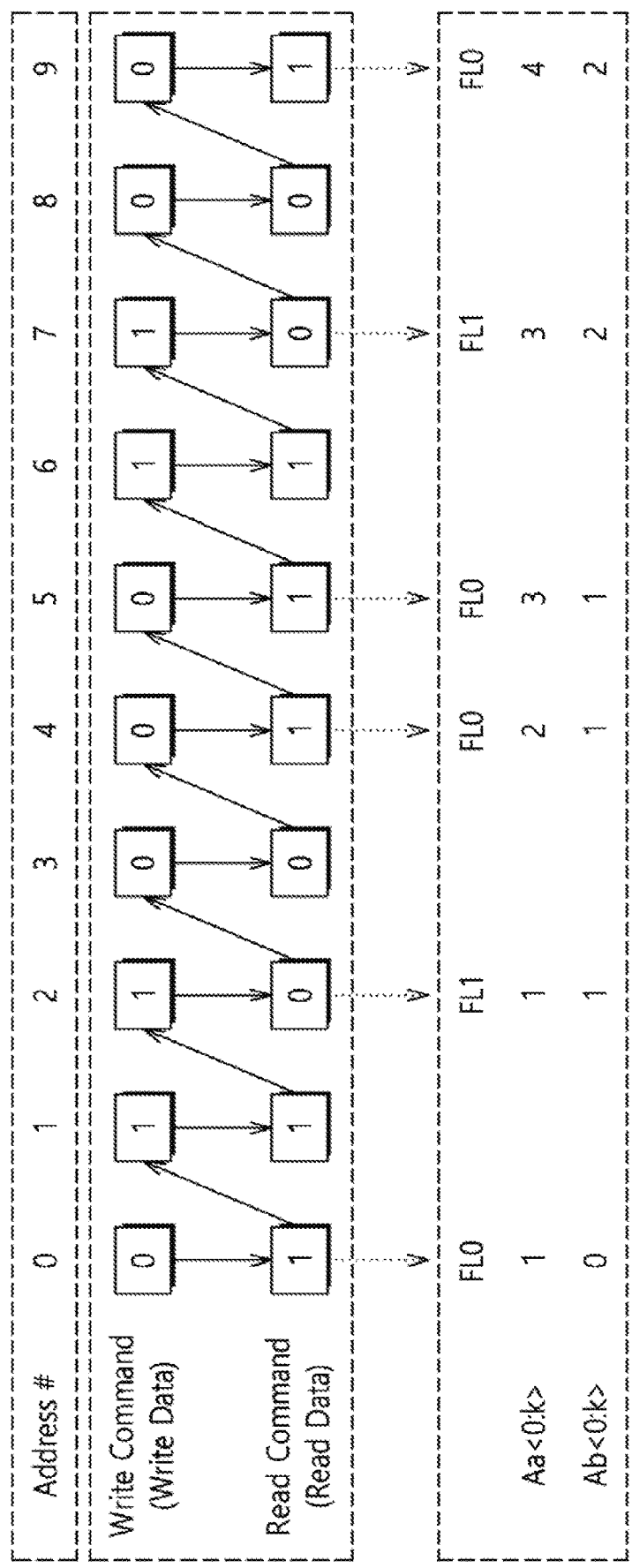
Figure 7:
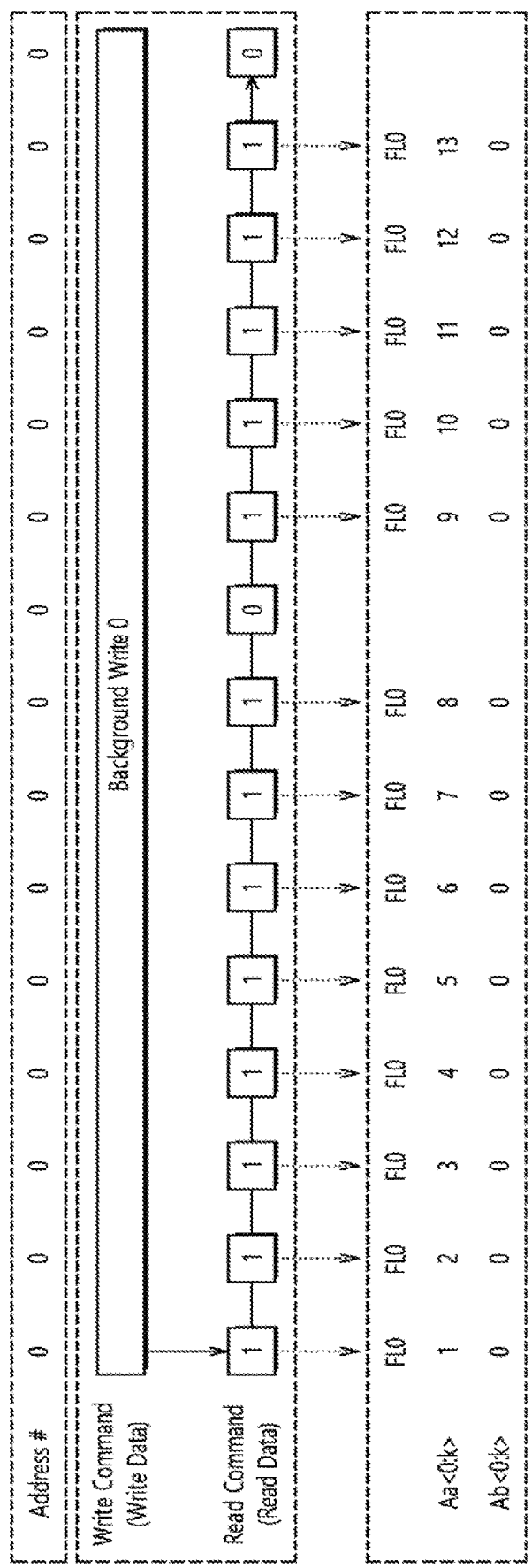

FIG. 4 and FIG. 5 are diagrams illustrating examples of test operations for each address, and FIG. 6 and FIG. 7 are diagrams illustrating examples of test operations for substantially the same address.

Referring to FIG. 4, the test operation may be performed by a first method, for example, a bit by bit method.

The bit by bit method may be a method of counting a fail bit by repeating write and read in units of bits while changing Address #0 to #9.

In the bit by bit method, test data may be '0' or '1' during each write operation.

Because data '0' is written to Address #0 and '1' is read during a read operation, a fail bit related to '0', that is, the first fail discrimination signal FL0 may be generated. As the first fail discrimination signal FL0 is counted, the value of the first counting signal Aa<0:K> may increase to be '1' and the second counting signal Ab<0:K> may substantially maintain an initial value '0'.

Because data '1' is written to Address #1 and '1' is read during the read operation, it is determined as the pass and the first counting signal Aa<0:K> may substantially maintain the value of '1' and the second counting signal Ab<0:K> may substantially maintain the initial value '0'.

Because data '1' is written to Address #2 and '0' is read during the read operation, a fail bit related to '1', that is, the second fail discrimination signal FL1 may be generated. As the second fail discrimination signal FL1 is counted, the value of the first counting signal Aa<0:K> may be substantially maintained to '1' and the value of the second counting signal Ab<0:K> may increase to be '1'.

Because data '0' is written to Address #4 and '1' is read during the read operation, the fail bit related to '0', that is, the first fail discrimination signal FL0 may be generated. As the first fail discrimination signal FL0 is counted, the value of the first counting signal Aa<0:K> may increase to '2' and the value of the second counting signal Ab<0:K> may be substantially maintained to '1'.

Write and read for Address #5 to Address #8 and fail bit counting are performed in the above manner, so that the value of the first counting signal Aa<0:K> may become '3' and the value of the second counting signal Ab<0:K> may become '2'.

Because data '0' is written to Address #9 and '1' is read during the read operation, the fail bit related to '0', that is, the first fail discrimination signal FL0 may be generated. As the first fail discrimination signal FL0 is counted, the value of the first counting signal Aa<0: K> may increase to '4' and the value of the second counting signal Ab<0:K> may be substantially maintained to '2'.

Referring to FIG. 5, the test operation may be performed by a second method, for example, an all by all method.

The all by all method may be a method of dividing addresses into a plurality of groups, writing substantially the same data to each group, and then performing sequential read and fail bit counting. Data written to different groups may be different.

Among Address #0 to Address #14, data '0' may be written to Address #0 to Address #4 and then sequential read and fail bit counting may be performed, data '1' may be written to Address #5 to Address #9 and then sequential read and fail bit counting may be performed, and data '0' may be written to Address #10 to Address #14 and then sequential read and fail bit counting may be performed.

Four first fail discrimination signals FL0 are generated and the value of the first counting signal Aa<0:K> may become '4', and two second fail discrimination signals FL1 are generated and the value of the second counting signal Ab<0:K> may be substantially maintained to '2'.

Referring to FIG. 6 and FIG. 7, the test operation may be performed by a third method, for example, a method of writing substantially the same data to substantially the same address and then performing read and fail bit counting.

For example, data '0' may be written to Address #0 and then read and fail bit counting may be performed.

In the case of FIG. 6, as a result of performing the fail bit counting, two first fail discrimination signals FL0 are generated and the value of the first counting signal Aa<0:K> may become '2'.

In the case of FIG. 7, as a result of performing the fail bit counting, 13 first fail discrimination signals FL0 are generated and the value of the first counting signal Aa<0:K> may become '13'.

FIG. 6 and FIG. 7 illustrate merely examples in which data '0' is written, and data '1' may be written.

When the value of the first counting signal Aa<0:K> and the value of the second counting signal Ab<0:K> are equal to or less than predetermined reference values that may be determined differently to match the characteristics of a semiconductor circuit, it may be determined as a soft error, and when the values exceed the predetermined reference values, it may be determined as a hard error.

The case of FIG. 6 may be determined as the soft error, and when the case is determined as the soft error, an ECC correction operation may be performed.

On the other hand, the case of FIG. 7 may be determined as the hard error because a relatively larger number of fail bits may be generated than FIG. 6, and when the case is determined as the hard error, a repair operation may be performed to repair a failed cell with a redundancy cell.

Figure 8:
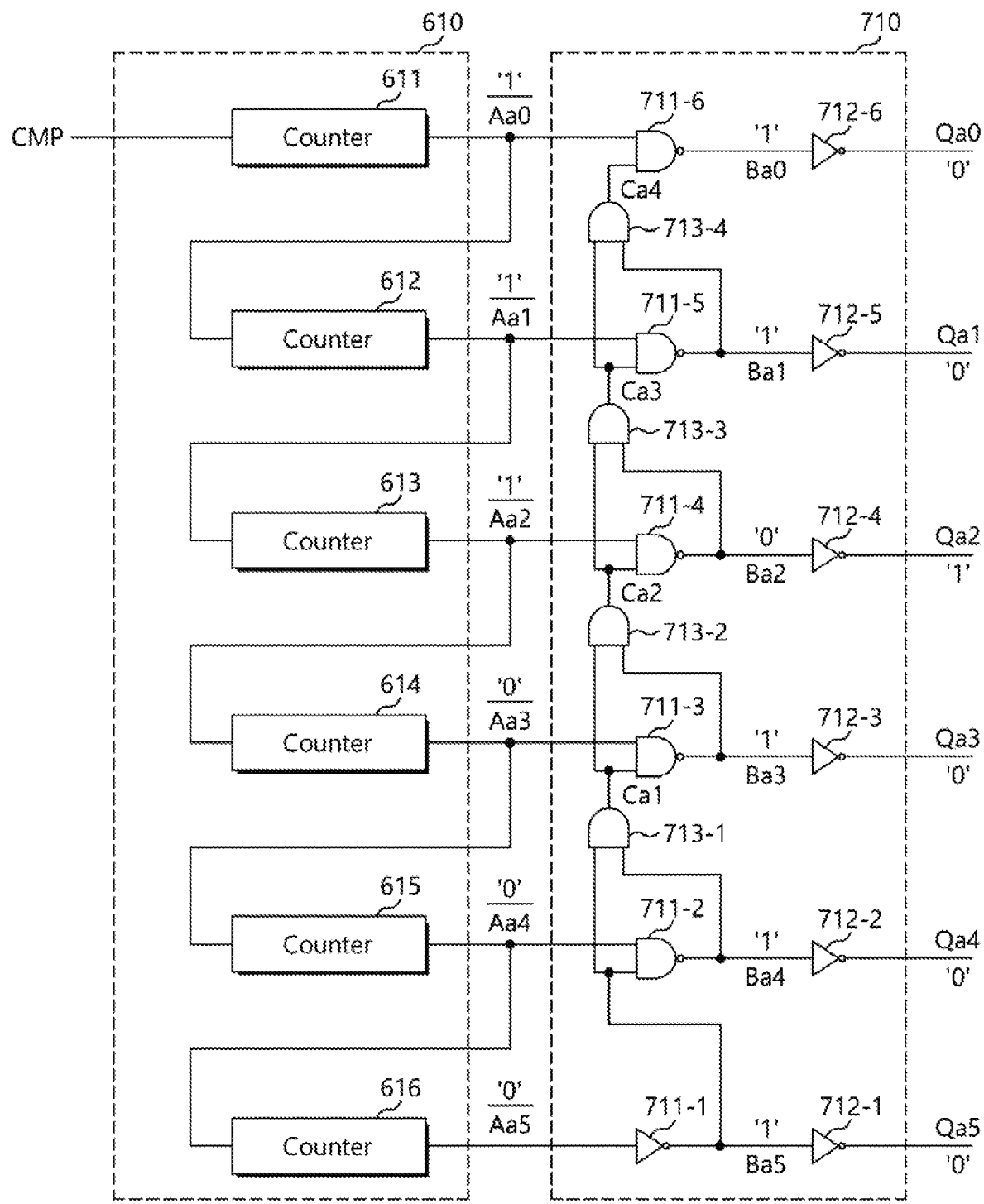
FIG. 8 and FIG. 9 are diagrams illustrating configurations of a fail bit counter and a counting signal correction circuit of FIG. 2.
Figure 9:
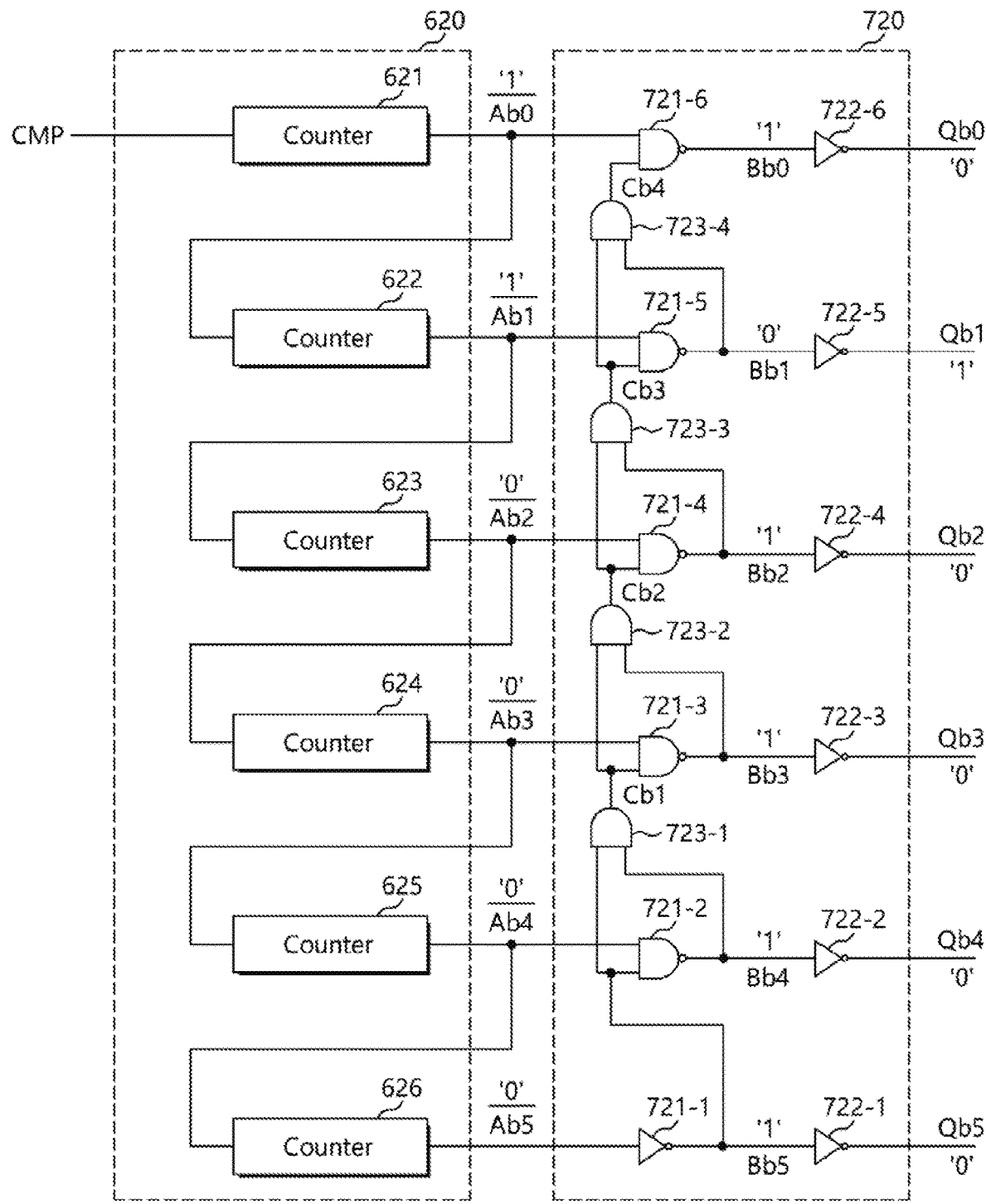

FIG. 8 and FIG. 9 are diagrams illustrating configurations of the fail bit counter and the counting signal correction circuit of FIG. 2.

FIG. 8 illustrates an example in which a first counting circuit 610 and a first correction circuit 710 are configured to generate the first counting signal (Aa<0:5>, K=5) of 6 bits and the first counting correction signal (Qa<0:5>, K=5) of 6 bits, respectively.

The first counting circuit 610 may include a plurality of unit counters 611 to 616.

The plurality of unit counters 611 to 616 may be configured to generate the first counting signal Aa<0:5> by counting the comparison result signal CMP or the output Aa0, Aa1, Aa2, Aa3, and Aa4 of the counters of previous sequences.

The first correction circuit 710 may include a plurality of inverters 711-1 and 712-1 to 712-6, a plurality of NAND gates 711-2 to 711-6, and a plurality of AND gates 713-1 to 713-4.

The first inverter 711-1 may output a signal Ba5 obtained by inverting Aa5 of the first counting signal Aa<0:5>.

The second inverter 712-1 may invert the signal Ba5 and output the inverted signal as Qa5 of the first counting correction signal Qa<0:5>.

The first NAND gate 711-2 may output a signal Ba4 obtained by performing a logical inverse AND operation on Aa4 of the first counting signal Aa<0:5> and the signal Ba5.

The third inverter 712-2 may invert the signal Ba4 and output the inverted signal as Qa4 of the first counting correction signal Qa<0:5>.

The first AND gate 713-1 may output a signal Ca1 obtained by performing a logical AND operation on the signal Ba4 and the signal Ba5.

The second NAND gate 711-3 may output a signal Ba3 obtained by performing a logical inverse AND operation on Aa3 of the first counting signal Aa<0:5> and the signal Ca1.

The fourth inverter 712-3 may invert the signal Ba3 and output the inverted signal as Qa3 of the first counting correction signal Qa<0:5>.

The second AND gate 713-2 may output a signal Ca2 obtained by performing a logical AND operation on the signal Ba3 and the signal Ca1.

The third NAND gate 711-4 may output a signal Ba2 obtained by performing a logical inverse AND operation on Aa2 of the first counting signal Aa<0:5> and the signal Ca2.

The fifth inverter 712-4 may invert the signal Ba2 and output the inverted signal as Qa2 of the first counting correction signal Qa<0:5>.

The third AND gate 713-3 may output a signal Ca3 obtained by performing a logical AND operation on the signal Ba2 and the signal Ca2.

The fourth NAND gate 711-5 may output a signal Ba1 obtained by performing a logical inverse AND operation on Aa1 of the first counting signal Aa<0:5> and the signal Ca3.

The sixth inverter 712-5 may invert the signal Ba1 and output the inverted signal as Qa1 of the first counting correction signal Qa<0:5>.

The fourth AND gate 713-4 may output a signal Ca4 obtained by performing a logical AND operation on the signal Ba1 and the signal Ca3.

The fifth NAND gate 711-6 may output a signal Ba0 obtained by performing a logical inverse AND operation on Aa0 of the first counting signal Aa<0:5> and the signal Ca4.

The seventh inverter 712-6 may invert the signal Ba0 and output the inverted signal as Qa0 of the first counting correction signal Qa<0:5>.

As illustrated in the example of FIG. 8, when the first counting signal Aa<0:5> has a value of '111000', the logics of the first correction circuit 710 may output, as the first counting correction signal Qa<0:5>, '001000', which is a value obtained by resetting the remaining bits Aa0 and Aa1, except for the most significant bit Aa2 of the bits Aa<0:2>, having a value of '1', of Aa<0:5>, to '0'.

FIG. 9 illustrates an example in which a second counting circuit 620 and a second correction circuit 720 are configured to generate the second counting signal (Ab<0:5>, K=5) of 6 bits and the second counting correction signal (Qb<0:5>, K=5) of 6 bits, respectively.

The first counting circuit 620 may include a plurality of unit counters 621 to 626.

The plurality of unit counters 621 to 626 may be configured to generate the second counting signal Ab<0:5> by counting the comparison result signal CMP or the output Ab0, Ab1, Ab2, Ab3, and Ab4 of the counters of previous sequences.

The second correction circuit 720 may include a plurality of inverters 721-1 and 722-1 to 722-6, a plurality of NAND gates 721-2 to 721-6, and a plurality of AND gates 723-1 to 723-4.

The first inverter 721-1 may output a signal Bb5 obtained by inverting Ab5 of the second counting signal Ab<0:5>.

The second inverter 722-1 may invert the signal Bb5 and output the inverted signal as Qb5 of the second counting correction signal Qb<0:5>.

The first NAND gate 721-2 may output a signal Bb4 obtained by performing a logical inverse AND operation on Ab4 of the second counting signal Ab<0:5> and the signal Bb5.

The third inverter 722-2 may invert the signal Bb4 and output the inverted signal as Qb4 of the second counting correction signal Qb<0:5>.

The first AND gate 723-1 may output a signal Cb1 obtained by performing a logical AND operation on the signal Bb4 and the signal Bb5.

The second NAND gate 721-3 may output a signal Bb3 obtained by performing a logical inverse AND operation on Ab3 of the second counting signal Ab<0:5> and the signal Cb1.

The fourth inverter 722-3 may invert the signal Bb3 and output the inverted signal as Qb3 of the second counting correction signal Qb<0:5>.

The second AND gate 723-2 may output a signal Cb2 obtained by performing a logical AND operation on the signal Bb3 and the signal Cb1.

The third NAND gate 721-4 may output a signal Bb2 obtained by performing a logical inverse AND operation on Ab2 of the second counting signal Ab<0:5> and the signal Cb2.

The fifth inverter 722-4 may invert the signal Bb2 and output the inverted signal as Qb2 of the second counting correction signal Qb<0:5>.

The third AND gate 723-3 may output a signal Cb3 obtained by performing a logical AND operation on the signal Bb1 and the signal Cb2.

The fourth NAND gate 721-5 may output a signal Bb1 obtained by performing a logical inverse AND operation on Ab1 of the second counting signal Ab<0:5> and the signal Cb3.

The sixth inverter 722-5 may invert the signal Bb1 and output the inverted signal as Qb1 of the second counting correction signal Qb<0:5>.

The fourth AND gate 723-4 may output a signal Cb4 obtained by performing a logical AND operation on the signal Bb1 and the signal Cb3.

The fifth NAND gate 721-6 may output a signal Bb0 obtained by performing a logical inverse AND operation on Ab0 of the second counting signal Ab<0:5> and the signal Cb4.

The seventh inverter 722-6 may invert the signal Bb0 and output the inverted signal as Qb0 of the second counting correction signal Qb<0:5>.

As illustrated in the example of FIG. 9, when the second counting signal Ab<0:5> has a value of '110000', the logics of the second correction circuit 720 may output, as the second counting correction signal Qb<0:5>, '010000', which is a value obtained by resetting the remaining bits Ab0, except for the most significant bit Ab1 of the bits Ab<0:1>, having a value of '1', of Ab<0:5>, to '0'.

Figure 10:
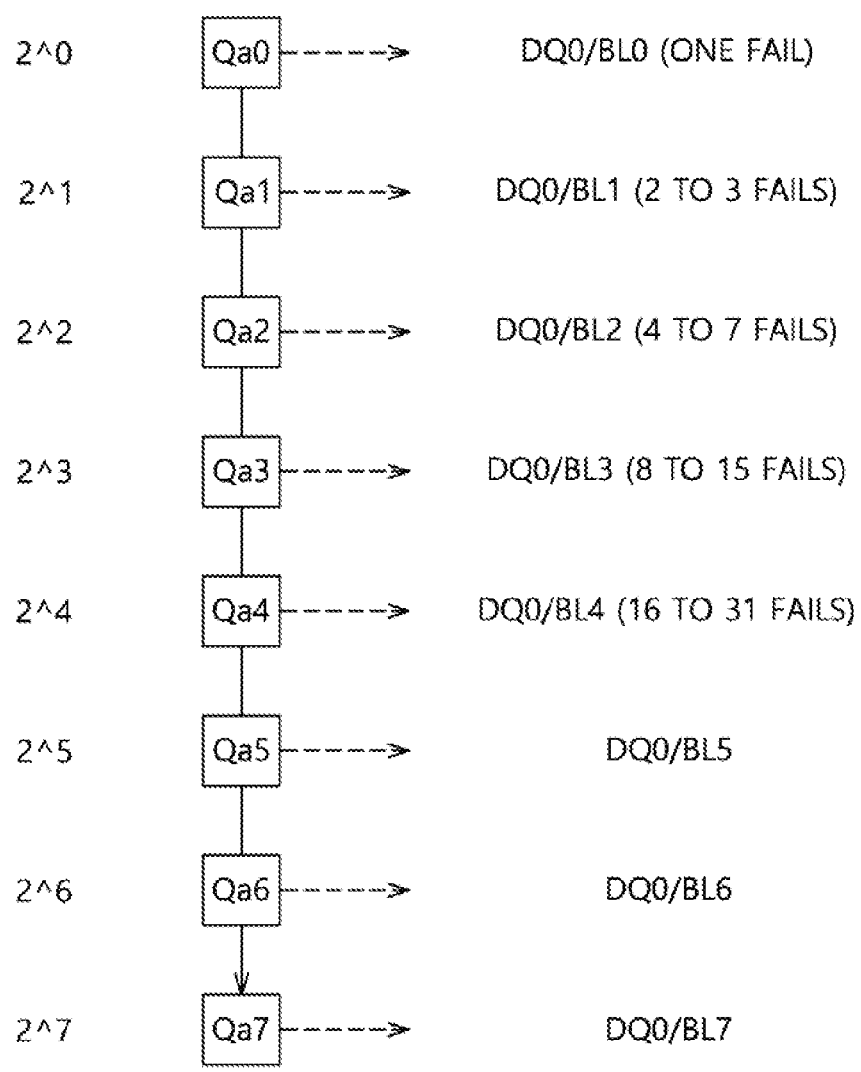
FIG. 10 and FIG. 11 are diagrams for explaining a fail flag output method in accordance with an embodiment.
Figure 11:
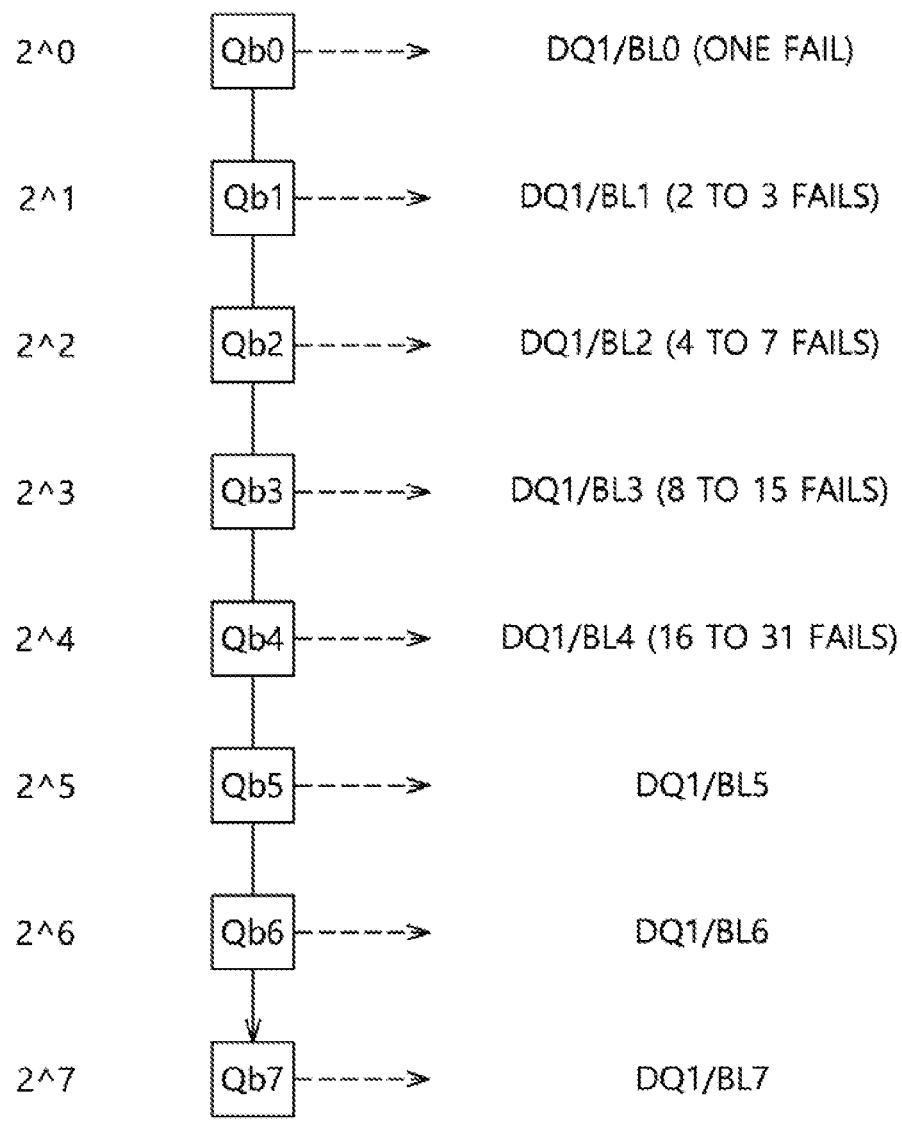

FIG. 10 and FIG. 11 are diagrams for explaining a fail flag output method in accordance with an embodiment.

The semiconductor apparatus 300 in accordance with an embodiment may provide the host 200 with a first fail flag using the first counting correction signal Qa<0:K> and a second fail flag using the second counting correction signal Qb<0:K>, which have been described with reference to FIG. 8 and FIG. 9.

The semiconductor apparatus 300 may provide the host 200 with the first fail flag and the second fail flag through the data input/output pads DQ.

The semiconductor apparatus 300 may put the first fail flag into one of data (for example, BL0, BL1, BL2, ~BLn, n=5) of a burst length (BL) outputted through any one (for example, DQ0) of the data input/output pads DQ.

The first counting correction signal Qa<0:K> may be used as the first fail flag.

The semiconductor apparatus 300 may put the second fail flag into one of data (for example, BL0, BL1, BL2, ~BLn, n=5) of a burst length (BL) outputted through another one (for example, DQ1) of the data input/output pads DQ.

The second counting correction signal Qb<0:K> may be used as the second fail flag.

FIG. 10 and FIG. 11 illustrate examples in which the bits Aa0 to Aa5 of the first counting signal (Aa<0:K>, K=5) are allocated to BL0 to BL5 of DQ0 one by one and the bits Ab0 to Ab5 of the second counting signal (Ab<0:K>, K=5) are allocated to BL0 to BL5 of DQ1 one by one.

In such a case, because two or bits of each of the first counting signal Aa<0:K> and the second counting signal Ab<0:K> may have a value of '1' according to the number of fail bits, when the first counting signal Aa<0:K> and the second counting signal Ab<0:K> are put into DQ0/BL<0:5> and DQ1/BL<0:5> as fail flags as is, a process in which the host 200 recognizes and processes the fail flags may be complicated.

In an embodiment, the first counting correction signal Qa<0:K>, which is generated by resetting the remaining bits, except for the most significant bit among the bits, having a value of '1', of the first counting signal Aa<0:K>, to '0' by using the first correction circuit 710, may be included in DQ0/BL<0:5> as the first fail flag and provided to the host 200.

In an embodiment, the second counting correction signal Qb<0:K>, which is generated by resetting the remaining bits, except for the most significant bit among the bits, having a value of '1', of the second counting signal Ab<0:K>, to '0' by using the second correction circuit 720, may be included in DQ1/BL<0:5> as the second fail flag and provided to the host 200.

Referring to FIG. 10, because Qa0 of the first counting correction signal Qa<0:K> may represent a binary number $2^0$, it may be defined that one first fail discrimination signal FL0 has been generated by putting high level Qa0 into BL0.

Because Qa1 may represent $2^1+2^0$, it may be defined that 2 to 3 first fail discrimination signals FL0 have been generated by putting high level Qa1 into BL1.

Because Qa2 may represent $2^2+2^1+2^0$, it may be defined that 4 to 7 first fail discrimination signals FL0 have been generated by putting high level Qa2 into BL2.

Similarly, it may be defined that 8 to 15 first fail discrimination signals FL0 have been generated by putting high level Qa3 into BL3, it may be defined that 16 to 31 first fail discrimination signals FL0 have been generated by putting high level Qa4 into BL4, and it may be defined that 32 to 63 first fail discrimination signals FL0 have been generated by putting high level Qa5 into BL5.

Referring to FIG. 11, because Qb0 of the second counting correction signal Qb<0:K> may represent a binary number $2^0$, it may be defined that one second fail discrimination signal FL1 has been generated by putting high level Qb0 into BL0.

Because Qb1 may represent $2^1+2^0$, it may be defined that 2 to 3 second fail discrimination signals FL1 have been generated by putting high level Qb1 into BL1.

Because Qb2 may represent $2^2+2^1+2^0$, it may be defined that 4 to 7 second fail discrimination signals FL1 have been generated by putting high level Qb2 into BL2.

Similarly, it may be defined that 8 to 15 second fail discrimination signals FL1 have been generated by putting high level Qb3 into BL3, it may be defined that 16 to 31 second fail discrimination signals FL1 have been generated by putting high level Qb4 into BL4, and it may be defined that 32 to 63 second fail discrimination signals FL1 have been generated by putting high level Qb5 into BL5.

Meanwhile, when the first counting correction signal Qa<0:5> at a low level is allocated to BL<0:5>, it may be defined that the first fail discrimination signal FL0 has not been generated, and when the second counting correction signal Qb<0:5> at a low level is allocated to BL<0:5>, it may be defined that the second fail discrimination signal FL1 has not been generated.

Because the aforementioned example is merely an example in which the first counting correction signal Qa<0:5> is allocated to DQ0/BL<0:5> as the first fail flag and the second counting correction signal Qb<0:5> is allocated to DQ1/BL<0:5> as the second fail flag, DQ of another sequence may also be used, and in the case of a circuit configuration of increasing the number of bits of a signal in which fail bits have been counted, the generation of a larger number of fail bits may be defined.

Figure 12:
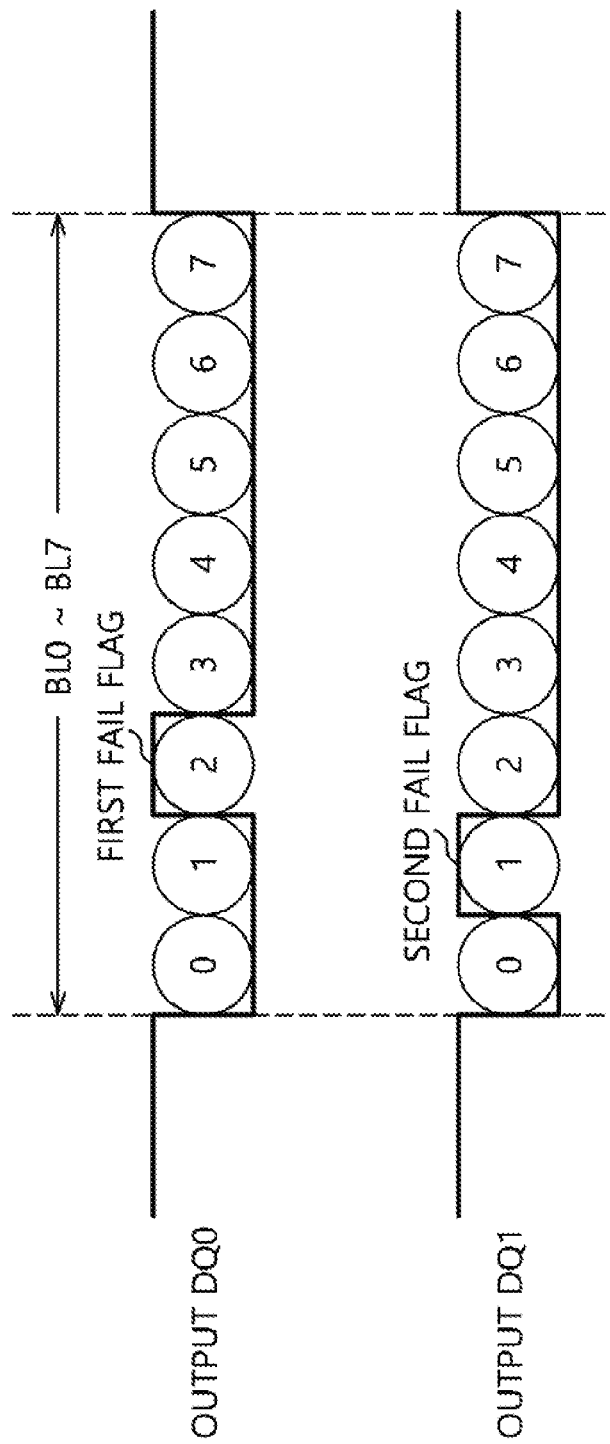
FIG. 12 is a diagram illustrating an example of the fail flag output method according to FIG. 10 and FIG. 11.

FIG. 12 is a diagram illustrating an example of the fail flag output method according to FIG. 10 and FIG. 11.

As described with reference to FIG. 8, when 7 first fail discrimination signals FL0 are generated, only Qa2 of the first counting correction signal Qa<0:K> is at a high level.

Because only the Qa2 of the first counting correction signal Qa<0:K> is at a high level, the first fail flag according to the high level Qa2 may be generated at a timing corresponding to BL2 of BL<0:5>, which may define that 4 to 7 fail bits have been generated, referring to FIG. 12.

As described with reference to FIG. 9, when it is assumed that 3 second fail discrimination signals FL1 are generated, only Qb1 of the second counting correction signal Qb<0:K> is at a high level.

Because only the Qb1 of the second counting correction signal Qb<0:K> is at a high level, the second fail flag according to the high level Qb1 may be generated at a timing corresponding to BL1 of BL<0:5>, which may define that 2 to 3 fail bits have been generated, referring to FIG. 12.

Figure 13:
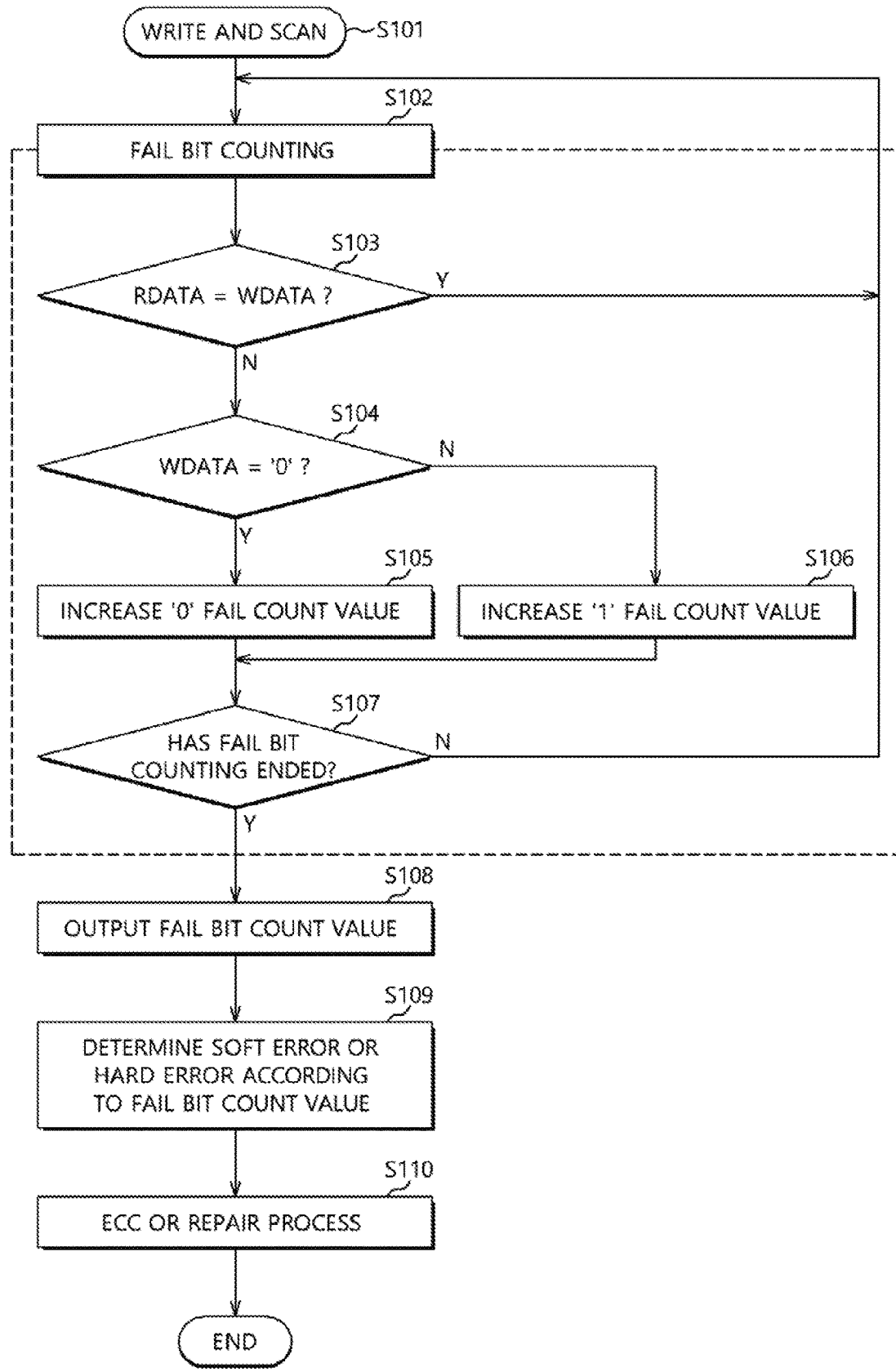
FIG. 13 is a flowchart illustrating a fail information control method in accordance with an embodiment.

FIG. 13 is a flowchart illustrating a fail information control method in accordance with an embodiment.

Hereinafter, fail bit counting and fail information processing method in accordance with an embodiment is described with reference to FIG. 13.

Referring to FIG. 13, a test data write and scan operation S101 and a fail bit counting operation S102 may be performed.

The fail bit counting may include a series of steps S103 to S107.

First, it is determined whether write data WDATA and read data RDATA coincide with each other (S103).

In step S103, when the write data WDATA and the read data RDATA do not coincide with each other, the type of a fail bit is determined, that is, it is determined whether the write data WDATA is '0' (S104).

In step S104, when the write data WDATA is '0', a '0' fail count value, that is, the value of the first counting signal Aa<0:K> is increased (S105).

In step S104, when the write data WDATA is not '0', a '1' fail count value, that is, the value of the second counting signal Ab<0:K> is increased (S106).

After step S105 or step S106 is performed, it is determined whether the fail bit counting has ended (S107).

In step S107, when the fail bit counting has not ended, the fail bit counting may be performed for another address or substantially the same address.

In step S107, when the fail bit counting for all addresses has ended, fail bit count values may be outputted (S108).

Step S108 may include an operation in which the first counting signal Aa<0:K> and the second counting signal Ab<0:K> are outputted to an exterior of the semiconductor apparatus 300, for example, the host 200, as the fail bit count values.

Step S108 may include an operation in which the first fail flag using the first counting correction signal Qa<0:K> and the second fail flag using the second counting correction signal Qb<0:K> are outputted to an exterior of the semiconductor apparatus 300, for example, the host 200, as the fail bit count values.

The host 200 may determine that an error detected in the semiconductor apparatus 300 is a soft error or a hard error according to the fail bit count value (S109).

When it is determined that the error detected in the semiconductor apparatus 300 is the soft error, the host 200 may allow the ECC correction to be performed, and when it is determined that the error detected in the semiconductor apparatus 300 is the hard error, the host 200 may allow the repair operation of replacing a failed cell with a redundancy cell to be performed (S110).

The fail bit count values outputted from the semiconductor apparatus 300 are values obtained by discriminating a fail bit related to '0' data or a fail bit related to '1' data.

Consequently, it is possible to accurately discriminate the soft error and the hard error according to the fail bit count values outputted from the semiconductor apparatus 300, so that it is possible to accurately select one of the ECC correction and the repair operation, thereby more efficiently using the memory area of the semiconductor apparatus 300.

While various embodiments have been described above, it will be understood to those skilled in the art that the embodiments described are examples only. Accordingly, the fail information control circuit, the semiconductor apparatus including the same, and the fail information control method of the semiconductor apparatus described herein should not be limited based on the described embodiments.

What is claimed is:

1. A fail information control circuit comprising:
a comparison circuit configured to generate a comparison result signal by comparing read data and write data;
a fail bit discrimination circuit configured to:
generate a first fail discrimination signal when a fail detected where the write data has a value '0'; and
generate a second fail discrimination signal when a fail detected where the write data has a value '1', in response to the comparison result signal; and
a fail bit counter configured to generate a first counting signal by counting the first fail discrimination signal and generate a second counting signal by counting the second fail discrimination signal.

2. The fail information control circuit according to claim 1, further comprising:
a counting signal correction circuit configured to:
output, as a first counting correction signal, a signal obtained by resetting levels of remaining bits, except for a most significant bit among high level bits of the first counting signal, to a low level; and
output, as a second counting correction signal, a signal obtained by resetting levels of remaining bits, except for a most significant bit among high level bits of the second counting signal, to a low level.

3. The fail information control circuit according to claim 1, wherein the fail bit discrimination circuit comprises:
a first logic gate configured to invert the write data and output the inverted write data as an output signal;
a second logic gate configured to output the second fail discrimination signal by performing a logical AND operation on the comparison result signal and the write data; and
a third logic gate configured to output the first fail discrimination signal by performing a logical AND operation on the comparison result signal and the output signal of the first logic gate.

4. A fail information control circuit comprising:
a comparison circuit configured to generate a comparison result signal by comparing read data and write data;
a fail bit discrimination circuit configured to generate a first fail discrimination signal for discriminating a fail detected when the write data has a first value and a second fail discrimination signal for discriminating a fail detected when the write data has a second value, in response to the comparison result signal; and
a fail information output circuit configured to:
generate a first counting signal and a second counting signal by counting the first fail discrimination signal and the second fail discrimination signal; and
generate a first counting correction signal and a second counting correction signal by resetting remaining bits, except for a most significant bit of a first level among bits of the first counting signal and the second counting signal.

5. The fail information control circuit according to claim 4, wherein the fail bit discrimination circuit comprises:
a first logic gate configured to invert the write data and output the inverted write data as an output signal;
a second logic gate configured to output the second fail discrimination signal by performing a logical AND operation on the comparison result signal and the write data; and
a third logic gate configured to output the first fail discrimination signal by performing a logical AND operation on the comparison result signal and the output signal of the first logic gate.

6. The fail information control circuit according to claim 4, wherein the fail information output circuit comprises:
a fail bit counter configured to:
generate a first counting signal by counting the first fail discrimination signal; and
generate a second counting signal by counting the second fail discrimination signal; and
a counting signal correction circuit configured to:
output, as the first counting correction signal, a signal obtained by resetting levels of the remaining bits, except for the most significant bit among bits having a first level of the first counting signal, to a second level; and output, as the second counting correction signal, a signal obtained by resetting levels of the remaining bits, except for the most significant bit among bits having the first level of the second counting signal, to the second level.

7. A semiconductor apparatus comprising:
a memory area;
input/output pads; and
a fail information control circuit configured to:
generate a first fail discrimination signal when a fail detected where the write data has a value '0' and generate a second fail discrimination signal when a fail detected where the write data has a value '1' according to a result of comparing the write data provided to the memory area with read data outputted from the memory area; and
generate a first counting signal by counting the first fail discrimination signal and generate a second counting signal by counting the second fail discrimination signal,
wherein the first counting signal and the second counting signal are outputted to an exterior through the input/output pads.

8. The semiconductor apparatus according to claim 7, wherein the semiconductor apparatus outputs the first counting signal through one of the input/output pads and outputs the second counting signal through another one of the input/output pads.

9. The semiconductor apparatus according to claim 7, wherein the fail information control circuit is configured to:
generate a first counting correction signal by resetting levels of remaining bits, except for a most significant bit among high level bits of the first counting signal, to a low level; and
generate a second counting correction signal by resetting levels of remaining bits, except for a most significant bit among high level bits of the second counting signal, to a low level.

10. The semiconductor apparatus according to claim 9, wherein the semiconductor apparatus puts the first counting correction signal into one of data of a burst length outputted through one of the input/output pads, and
puts the second counting correction signal into one of data of a burst length outputted through another one of the input/output pads.

11. The semiconductor apparatus according to claim 7, further comprising:
a repair circuit configured to:
control an operation of programming a failed address corresponding to a failed cell of memory cells of the memory area into a one-time programmable (OTP) memory; and
control an operation of accessing an address corresponding to a redundancy memory cell instead of the failed address when an address provided from an exterior coincides with the failed address during a normal operation.

12. The semiconductor apparatus according to claim 7, further comprising:
an ECC circuit configured to perform a correction operation using an error correction code on input/output data of the semiconductor apparatus.

13. A fail information control method of a semiconductor apparatus, the method comprising:
a comparison step of comparing read data and write data;
a counting step of classifying a type of fail bits into a first fail when the write data and the read data do not coincide with each other in the comparison step, and generating a first counting signal;
a counting step of classifying a type of fail bits into a first fail and a second fail when the write data and the read data do not coincide with each other in the comparison step, and generating a first counting signal and a second counting signal; and
an output step of outputting the first counting signal and the second counting signal to an exterior of the semiconductor apparatus,
wherein the counting step comprises:
determining whether the write data is '0' when the write data and the read data do not coincide with each other; and
increasing a value of the first counting signal when the write data is determined to be '0' and increasing a value of the second counting signal when the write data is determined not to be '0'.

14. The fail information control method according to claim 13, wherein the output step comprises:
outputting the first counting signal through one of input/output pads of the semiconductor apparatus; and
outputting the second counting signal through another one of the input/output pads.

15. The fail information control method according to claim 13, wherein the output step comprises:
putting the first counting signal into one of data of a burst length outputted through one of the input/output pads; and
putting the second counting signal into one of data of a burst length outputted through another one of the input/output pads.

16. The fail information control method according to claim 13, wherein the output step comprises:
generating a first counting correction signal by resetting levels of remaining bits, except for a most significant bit among high level bits of the first counting signal, to a low level and outputting the first counting correction signal through one of the input/output pads of the semiconductor apparatus; and
generating a second counting correction signal by resetting levels of remaining bits, except for a most significant bit among high level bits of the second counting signal, to a low level and outputting the second counting correction signal through another one of the input/output pads.

17. The fail information control method according to claim 13, wherein the output step comprises:
generating a first counting correction signal by resetting levels of remaining bits, except for a most significant bit among high level bits of the first counting signal, to a low level and putting the first counting correction signal into one of data of a burst length outputted through one of the input/output pads; and
generating a second counting correction signal by resetting levels of remaining bits, except for a most significant bit among high level bits of the second counting signal, to a low level and putting the second counting correction signal into one of data of a burst length outputted through another one of the input/output pads.

* * * * *